(12) United States Patent
Gouin et al.

(10) Patent No.: US 11,692,101 B2
(45) Date of Patent: Jul. 4, 2023

(54) PROTECTIVE COATING COMPOSITION FOR SUBSTRATES IN CONTACT WITH MOLTEN METAL

(71) Applicant: PYROTEK HIGH TEMPERATURE INDUSTRIAL PRODUCTS INC., Drummondville (CA)

(72) Inventors: Marcel Gouin, Sherbrooke (CA); François Veillette, St. Camille (CA); Alain Simard, Chicoutimi (CA)

(73) Assignee: Pyrotek High Temperature Industrial Products Inc., Drummondville (CA)

(*) Notice: Subject to any disclaimer, the term of this patent is extended or adjusted under 35 U.S.C. 154(b) by 576 days.

(21) Appl. No.: 16/617,198

(22) PCT Filed: Feb. 22, 2019

(86) PCT No.: PCT/CA2019/050222
§ 371 (c)(1),
(2) Date: Nov. 26, 2019

(87) PCT Pub. No.: WO2019/161507
PCT Pub. Date: Aug. 29, 2019

(65) Prior Publication Data
US 2021/0087405 A1 Mar. 25, 2021

Related U.S. Application Data

(60) Provisional application No. 62/634,482, filed on Feb. 23, 2018.

(51) Int. Cl.
*C09D 1/00* (2006.01)
*C09D 7/61* (2018.01)
(Continued)

(52) U.S. Cl.
CPC ............... *C09D 1/00* (2013.01); *C09D 5/084* (2013.01); *C09D 5/18* (2013.01); *C09D 7/61* (2018.01);
(Continued)

(58) Field of Classification Search
None
See application file for complete search history.

(56) References Cited

U.S. PATENT DOCUMENTS

| 4,857,489 A | 8/1989 | Bearden |
| 6,051,058 A | 4/2000 | Crisci et al. |

(Continued)

FOREIGN PATENT DOCUMENTS

| CA | 2936512 A1 | 7/2015 |
| CA | 3030877 A1 | 2/2018 |

(Continued)

OTHER PUBLICATIONS

Search Report and Written Opinion from PCT/CA2019/050222 dated May 3, 2019.

(Continued)

*Primary Examiner* — Robert T Butcher
(74) *Attorney, Agent, or Firm* — Calfee, Halter & Griswold LLP (57) ABSTRACT

A coating composition and a method of making a coating composition is provided. The coating composition includes: a) a binder system comprising a mixture of a caramelized carbohydrate component, an inorganic colloidal binder, and an adjuvant; and b) a protective agent. The coating composition is useful for protecting articles from corrosion and/or erosion caused by contact with molten metal.

20 Claims, 3 Drawing Sheets

(51) Int. Cl.
  *C09D 7/63* (2018.01)
  *C09D 5/08* (2006.01)
  *C09D 5/18* (2006.01)
  *C08K 5/1545* (2006.01)
  *C08K 13/02* (2006.01)
  *C08K 3/30* (2006.01)
  *C08K 3/32* (2006.01)
  *C08K 3/38* (2006.01)

(52) U.S. Cl.
  CPC .............. *C09D 7/63* (2018.01); *C08K 5/1545* (2013.01); *C08K 13/02* (2013.01); *C08K 2003/3081* (2013.01); *C08K 2003/325* (2013.01); *C08K 2003/329* (2013.01); *C08K 2003/385* (2013.01); *C08K 2201/014* (2013.01)

(56) References Cited

U.S. PATENT DOCUMENTS

2017/0008075 A1\* 1/2017 Gouin ................ D06M 13/148
2017/0028466 A1 2/2017 Gouin et al.

FOREIGN PATENT DOCUMENTS

| GB | 1394730 A | 5/1975 |
|----|-----------|--------|
| JP | 60108140 A | 6/1985 |
| JP | 2017503044 A | 1/2017 |
| WO | 2015109408 A1 | 7/2015 |
| WO | 2018018156 A1 | 2/2018 |

OTHER PUBLICATIONS

First Examination Report from Indian Patent Application No. 202037040525 dated Feb. 10, 2022.
Extended European Search Report for European Application No. 19757417.1 dated Feb. 26, 2021.
Office Action from Chinese Application No. 201980015029.8 dated Sep. 1, 2021 and English Summary (27 pages).
Second Office Action from Chinese Application No. 201980015029.8 dated May 23, 2022 and English Summary (23 pages).
Office Action from Japanese Application No. 2020-544788 dated Nov. 1, 2022, 5 pages.

\* cited by examiner

PROTECTIVE COATING COMPOSITION FOR SUBSTRATES IN CONTACT WITH MOLTEN METAL

CROSS-REFERENCE TO RELATED APPLICATIONS

This application is the U.S. national stage entry of International Application No. PCT/CA2019/050222, filed Feb. 22, 2019, which claims priority to and the benefit of U.S. Provisional Patent Application No. 62/634,482, filed Feb. 23, 2018, the entire disclosures of which are incorporated herein by reference in full.

FIELD

The present disclosure relates to a coating composition and a method of making a coating composition. More particularly, the present disclosure relates to a coating composition that imparts a protective layer on a substrate to protect the substrate against corrosion and/or erosion caused by contact with molten metal.

BACKGROUND

Articles intended to be placed in contact with molten metals (e.g., liquid aluminum or liquid aluminum alloys) are typically made of refractory, metal, and/or glass materials. Such articles may be used for the sensing, melting, transferring, and/or casting of the molten metals. It is well known that molten metals can be corrosive, and thus, articles coming into contact with molten metals may experience corrosion and/or erosion, which can reduce the useful service life of such articles.

Resistance to such corrosion and/or erosion may be provided in part by protective agents that are applied to the articles. One example of a protective agent is hexagonal boron nitride (hBN), which provides corrosion protection and is used in connection with articles made of refractory, metal, or glass. Other protective agents are also used for different applications. For example, bone ash is often used to repair and protect trough systems where liquid metal flows during casting operations. Other protective agents that are less often used include mica, graphite, calcium silicate, talc, aluminum titanate, barium carbonate, and combinations thereof. However, a number of these protective agents (e.g., boron nitride, mica) are difficult to bind to a surface (i.e., substrate) of such articles using an aqueous medium.

Conventionally, protective agents may be applied as a wet slurry on the surfaces of the article that comes into contact with molten metal. When the protective agent is deposited onto a surface in the form of a wet slurry, as is typically the case with hBN, adhesion between the protective agent and the substrate is very weak and does not provide long term protection of the substrate.

SUMMARY

Disclosed herein are coating compositions, methods of making coating compositions, and articles having a solid coating formed from the coating compositions.

In accordance with the present disclosure, a coating composition is provided. The coating composition includes: a) a binder system comprising a mixture of a caramelized carbohydrate component, an inorganic colloidal binder, and an adjuvant; and b) a protective agent.

In accordance with the present disclosure, a method of making a coating composition is provided. The method includes preparing a mixture comprising water and a carbohydrate. The mixture is heated to form a caramelized carbohydrate component. The caramelized carbohydrate component is mixed with an inorganic colloidal binder and an adjuvant to form a binder system. The binder system is mixed with a protective agent to form the coating composition.

In accordance with the present disclosure, an article having a solid coating is provided. The article includes a substrate and a solid coating on at least a portion of the substrate. The solid coating is formed from a coating composition that includes: a) a binder system comprising a mixture of a caramelized carbohydrate component, an inorganic colloidal binder, and an adjuvant; and b) a protective agent.

DETAILED DESCRIPTION

Disclosed herein are coating compositions, methods of making coating compositions, and articles having a solid coating formed from the coating compositions. While the present disclosure describes exemplary embodiments of the compositions, methods, and articles in detail, the present disclosure is not intended to be limited to the disclosed embodiments. Also, certain elements of exemplary embodiments disclosed herein are not limited to any exemplary embodiments, but instead apply to all embodiments of the present disclosure.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or"

is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

The coating compositions, articles having a solid coating, and corresponding methods of making the coating compositions of the present disclosure can comprise, consist of, or consist essentially of the essential elements of the disclosure as described herein, as well as any additional or optional element described herein or which is otherwise useful in coating applications.

All percentages, parts, and ratios as used herein are by weight of the total composition, unless otherwise specified. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The coating composition according to the present disclosure includes: a) a binder system comprising a mixture of a caramelized carbohydrate component, an inorganic colloidal binder, and an adjuvant; and b) a protective agent. The coating composition disclosed herein can be used to form a solid coating on a surface of an article that is intended to be in contact with a molten metal. The solid coating exhibits excellent adhesion to the surface of articles and creates a surface that provides protection against corrosion and/or erosion caused by contact with molten metals. The coating composition according to the present disclosure is particularly effective against the corrosiveness of molten metals, such as aluminum and aluminum alloys, which results from the reductive action of molten metals imparted by their oxygen avidity. Not only does the solid coating provide a protective barrier against molten metals, but it also provides protection against corrosive gases that may evolve from the molten metals, such as in the case of aluminum alloys having a high magnesium content (e.g., aluminum alloy 5182).

Without being bound by any particular theory, it is believed that the caramelized carbohydrate component, in particular the caramel products of the caramelized carbohydrate component, encapsulates the particles of the inorganic colloidal binder. This encapsulation is believed to preserve the ability of the inorganic colloidal binder to bind at high temperatures (e.g., 550° C. to 1,000° C.) by preventing particles of the inorganic colloidal binder from aggregating or binding to one another. Furthermore, it is believed that particles of the inorganic colloidal binder function by attaching to defects in the molecular arrangement of the protective agent. It is believed that the caramelized carbohydrate component encapsulating the particles of the inorganic colloidal binder also acts as a wetting agent that facilitates more access and attachment to the defects of the protective agent and to the binding sites of a substrate by the particles of the inorganic colloidal binder. It is further believed that the preservation of the ability of the inorganic colloidal binder to bind at high temperatures creates stronger bonds between particles of the protective agent themselves, as well as creates stronger bonds between particles of the protective agent and the substrate. Without the binder system of the present disclosure, the inorganic colloidal binder tends to aggregate and bind to itself (see FIGS. 3 and 4), which reduces the number of binding sites available to form bonds between the protective agent and the substrate, as opposed to the discrete points and patches of inorganic colloidal binder (see FIGS. 1, 2, 5, and 6) that retain their ability to bind.

The coating composition disclosed herein includes a binder system comprising a mixture of a caramelized carbohydrate component, an inorganic colloidal binder, and an adjuvant. In embodiments of the present disclosure, the binder system is an aqueous liquid, which allows the coating composition to be easily applied to a substrate.

In embodiments of the present disclosure, the caramelized carbohydrate component is obtained by caramelization of a mixture comprising water and a carbohydrate. In certain embodiments, the caramelization is carried out by heating the mixture comprising water and the carbohydrate to a caramelization temperature, such as a temperature of 20° C. to 125° C., including 50° C. to 120° C., 60° C. to 120° C., 70° C. to 120° C., 80° C. to 120° C., 90° C. to 115° C., 100° C. to 110° C., and also including 100° C. to 105° C., for an effective amount of time to caramelize the carbohydrate, such as a time period of at least 5 minutes, including from 5 minutes to 30 minutes, from 5 minutes to 20 minutes, and also including from 5 minutes to 10 minutes. While the caramelization process remains poorly understood, heating of the carbohydrate will form, inter alia, caramel products, such as caramelan, caramelen, and caramelin.

The caramelized carbohydrate component may be derived from the caramelization of a variety of carbohydrates. In accordance with the present disclosure, the caramelized carbohydrate component is derived from at least one of a monosaccharide, a disaccharide, a trisaccharide, and an oligosaccharide. Exemplary monosaccharides include, but are not limited to, glucose, fructose, and galactose. Exemplary disaccharides include, but are not limited to, sucrose, lactose, and maltose. Exemplary trisaccharides include, but are not limited to, maltotriose and raffinose. Exemplary oligosaccharides include, but are not limited to, maltodextrin, fructooligosaccharides, and galactooligosaccharides. In embodiments of the present disclosure, the caramelized carbohydrate component is derived from at least one of sucrose, glucose, fructose, galactose, maltose, and lactose. In embodiments of the present disclosure, the caramelized carbohydrate component is derived from sucrose.

In other embodiments, a pre-caramelized caramelized carbohydrate may be mixed with water to form the caramelized carbohydrate component. In such embodiments, the pre-caramelized caramelized carbohydrate and water mixture need not be processed (e.g., heated to a caramelization temperature) to obtain the caramelized carbohydrate component.

In accordance with the present disclosure, the binder system comprises an adjuvant. In embodiments, an adjuvant may be added to the mixture of water and the carbohydrate that is heated to form the caramelized carbohydrate component. In embodiments, an adjuvant may be added to a caramelized carbohydrate component that is obtained by mixing a pre-caramelized caramelized carbohydrate and water. The adjuvant may be one or more of an acid, an inorganic wetting agent, an acid phosphate adhesive, and bentonite. Exemplary acids include, but are not limited to, phosphoric acid, sulfuric acid, citric acid, acetic acid, boric acid, and oxalic acid. The acid may be useful for promoting caramelization of the carbohydrate at a lower temperature than would typically be required. Exemplary inorganic wetting agents include, but are not limited to, aluminum ammonium sulfate, magnesium sulfate, and aluminum sulfate. The inorganic wetting agent may act as a wetting agent in aqueous medium for the caramel products to wet the protective agent and the substrate. Exemplary acid phosphate adhesives include, but are not limited to, a calcium phosphate, a magnesium phosphate, and an aluminum phosphate, including monobasic, dibasic, and tribasic forms thereof, and various hydrates thereof.

In embodiments, the caramelized carbohydrate component includes: an acid comprising at least one of phosphoric acid, sulfuric acid, citric acid, acetic acid, boric acid, and oxalic acid; an inorganic wetting agent comprising at least one of aluminum ammonium sulfate, magnesium sulfate, and aluminum sulfate; and an acid phosphate adhesive comprising at least one of calcium phosphate, magnesium phosphate, and aluminum phosphate. In certain embodiments, the caramelized carbohydrate component includes phosphoric acid, which may be obtained by a mixture of 75 wt % $H_3PO_4$ and 25 wt % water, aluminum ammonium sulfate, which may include $AlNH_4(SO_4)_2 \cdot 12 H_2O$, and calcium phosphate monobasic, which may include the anhydrous or monohydrate forms. In embodiments, the caramelized carbohydrate component comprises one or more acids, and optionally comprises an inorganic wetting agent, an acid phosphate adhesive, and bentonite.

In embodiments, the caramelized carbohydrate component is formed by caramelization of a mixture comprising 25 wt % to 75 wt % of a carbohydrate, 25 wt % to 70 wt % of water, 0.05 wt % to 25 wt % of acid, 0 wt % to 5 wt % of inorganic wetting agent, 0 wt % to 2 wt % of acid phosphate adhesive, and 0 wt % to 20 wt % of bentonite.

In embodiments of the present disclosure, the caramelized carbohydrate component is formed by caramelization of a mixture comprising 40 wt % to 60 wt % of a carbohydrate, 40 wt % to 60 wt % of water, 1 wt % to 25 wt % of acid, 0 wt % to 1 wt % of inorganic wetting agent, 0 wt % to 1.5 wt % of an acid phosphate adhesive.

In embodiments of the present disclosure, the caramelized carbohydrate component is formed by caramelization of a mixture comprising 40 wt % to 50 wt % of a carbohydrate, 25 wt % to 40 wt % of water, 15 wt % to 25 wt % of acid, 0.25 wt % to 0.75 wt % of inorganic wetting agent, and 1 wt % to 1.5 wt % of acid phosphate adhesive.

In embodiments of the present disclosure, the caramelized carbohydrate component is formed by caramelization of a mixture comprising 45 wt % to 55 wt % of a carbohydrate, 30 wt % to 40 wt % of water, 0.5 wt % to 1.5 wt % of acid, 0.5 wt % to 0.75 wt % of inorganic wetting agent, 1 wt % to 1.5 wt % of acid phosphate adhesive, and 5 wt % to 15 wt % of bentonite.

In embodiments of the present disclosure, the caramelized carbohydrate component is formed by caramelization of a mixture comprising 65 wt % to 75 wt % of a carbohydrate, 25 wt % to 30 wt % of water, and 1.25 wt % to 1.75 wt % of acid.

In certain of the foregoing embodiments, the carbohydrate comprises sucrose, the acid comprises phosphoric acid, which may be obtained by a mixture of 75 wt % $H_3PO_4$ and 25 wt % water, the inorganic wetting agent comprises aluminum ammonium sulfate, which may include $AlNH_4(SO_4)_2 \cdot 12 H_2O$, and the acid phosphate adhesive comprises calcium phosphate monobasic, which may include the anhydrous or monohydrate forms. In certain of the foregoing embodiments, the acid comprises phosphoric acid and boric acid.

In embodiments of the present disclosure, the adjuvant is added to the caramelized carbohydrate component after the caramelized carbohydrate component is formed.

In addition to the caramelized carbohydrate component and the adjuvant, the binder system of the exemplary coating composition disclosed herein also includes an inorganic colloidal binder. In accordance with the present disclosure, the inorganic colloidal binder comprises at least one of a colloidal silica, a colloidal alumina, a colloidal zirconia, a colloidal yttria, and organically modified versions of the foregoing. One example of an organically modified inorganic colloidal binder is Ludox® SK colloidal silica, which is commercially available from W. R. Grace & Co.-Conn. (Columbia, Md.). In general, the inorganic colloidal binder is a suspension comprising submicron-sized inorganic particles (e.g., $SiO_2$, $Al_2O_3$, $ZrO_2$) dispersed in an aqueous solution. In embodiments of the present disclosure, the inorganic colloidal binder used to form the binder system of the coating composition comprises a colloidal silica.

One example of an inorganic colloidal binder suitable for use in the binder system of the exemplary coating composition disclosed herein is NALCO 1144 colloidal silica, which is commercially available from Nalco Company (Naperville, Ill.). The NALCO 1144 colloidal silica suspension has the following properties: 40 wt % of colloidal silica as $SiO_2$; a pH of 9.9 at 25° C.; an average particle diameter of 14 nm; a specific gravity of 1.30; a viscosity of 15 cP; and 0.45 wt % of $Na_2O$.

As previously mentioned, the binder system of the exemplary coating composition disclosed herein comprises a mixture of the caramelized carbohydrate component, the adjuvant, and the inorganic colloidal binder. In embodiments of the present disclosure, the caramelized carbohydrate component, which may comprise from 1 wt % to 25 wt % adjuvant (based on the total weight of the caramelized carbohydrate component), comprises from 5 wt % to 95 wt % of the binder system, and the inorganic colloidal binder comprises from 5 wt % to 95 wt % of the binder system. In embodiments of the present disclosure, the caramelized carbohydrate component, which may comprise from 1 wt % to 25 wt % adjuvant (based on the total weight of the caramelized carbohydrate component) comprises from 10 wt % to 90 wt % of the binder system, and the inorganic colloidal binder comprises from 10 wt % to 90 wt % of the binder system. In embodiments of the present disclosure, the caramelized carbohydrate component, which may comprise from 1 wt % to 25 wt % adjuvant (based on the total weight of the caramelized carbohydrate component), comprises from 15 wt % to 85 wt % of the binder system, and the inorganic colloidal binder comprises from 15 wt % to 85 wt % of the binder system. In embodiments of the present disclosure, the caramelized carbohydrate component, which may comprise from 1 wt % to 25 wt % adjuvant (based on the total weight of the caramelized carbohydrate component), comprises from 25 wt % to 75 wt % of the binder system, and the inorganic colloidal binder comprises from 25 wt % to 75 wt % of the binder system. In embodiments of the present disclosure, the caramelized carbohydrate component, which may comprise from 1 wt % to 25 wt % adjuvant (based on the total weight of the caramelized carbohydrate component), comprises from 40 wt % to 70 wt % of the binder system, and the inorganic colloidal binder comprises from 30 wt % to 60 wt % of the binder system. In embodiments of the present disclosure, the caramelized carbohydrate component comprises from 55 wt % to 75 wt % of the binder system, and the inorganic colloidal binder comprises from 25 wt % to 45 wt % of the binder system. In embodiments of the present disclosure, the caramelized carbohydrate component comprises from 60 wt % to 70 wt % of the binder system, and the inorganic colloidal binder comprises from 30 wt % to 40 wt % of the binder system. Any of the previously described caramelized carbohydrate components and inorganic colloidal binders may be used in the foregoing embodiments of the binder system. For example, in embodiments of the present disclosure, the caramelized carbohydrate component comprises from 40 wt % to 70 wt % of the binder system and is formed by caramelization of a mixture comprising 50 wt % to 60 wt % of a carbohydrate, such as sucrose, 35 wt % to 45 wt % of water, 0.75 wt % to 1.5 wt % of acid, such as phosphoric acid, 0.25 wt % to 0.75 wt % of inorganic wetting agent, such as aluminum ammonium sulfate, 1 wt % to 1.5 wt % of an acid phosphate adhesive, such as calcium phosphate monobasic, and 0 wt % to 6 wt % bentonite; and the inorganic colloidal binder comprises from 30 wt % to 60 wt % of the binder system and comprises a colloidal silica.

In embodiments of the present disclosure, the binder system comprises from 5 wt % to 70 wt % caramelized carbohydrate component, from 0.25 wt % to 10 wt % adjuvant, and from 25 wt % to 90 wt % inorganic colloidal binder, based on the total weight of the binder system. In embodiments of the present disclosure, the binder system comprises from 5 wt % to 45 wt % caramelized carbohydrate component, from 0.25 wt % to 3 wt % adjuvant, and from 50 wt % to 90 wt % inorganic colloidal binder, based on the total weight of the binder system. In embodiments of the present disclosure, the binder system comprises from 55 wt % to 70 wt % caramelized carbohydrate component, from 2 wt % to 10 wt % adjuvant, and from 25 wt % to 40 wt % inorganic colloidal binder, based on the total weight of the binder system.

In accordance with the present disclosure, the coating composition includes a protective agent. The protective agent may provide corrosion protection, erosion protection, or both corrosion protection and erosion protection. The protective agent may create a surface that is non-wetted by molten metals such as, for example, liquid aluminum and liquid aluminum alloys, thus providing protection to an underlying substrate against the corrosive and degrading effects of molten metals. A variety of protective agents may be used in the exemplary coating compositions disclosed herein. The protective agent may be selected based upon the particular type of molten metal with which the coating composition will come into contact.

In accordance with the present disclosure, the protective agent comprises one or more of a silicate, a metal oxide, a boride, a nitride, a carbide, a sulfide, a fluoride, an aluminide, a synthetic glass, glass fibers, ceramic fibers, graphite, bone ash, aluminum titanate, and calcium aluminate. Exemplary silicates include, but are not limited to, aluminum silicate, magnesium silicate, calcium silicate, sodium silicate, potassium silicate, zirconium silicate, mica, wollastonite, microlite, and talc. Exemplary metal oxides include, but are not limited to, MgO, $Al_2O_3$, $TiO_2$, $ZrO_2$, $Y_2O_3$, and $WO_2$. Exemplary borides include, but are not limited to, E-glass and $ZrB_2$. Exemplary nitrides include, but are not limited to, boron nitride, aluminum nitride, and silicon nitride. Exemplary carbides include, but are not limited to, silicon carbide and boron carbide. Exemplary sulfides include, but are not limited to, $BaSO_4$. Exemplary fluorides include, but are not limited to, $CaF_2$ and $AlF_3$. Exemplary aluminides include, but are not limited to, MgAl and TiAl.

In embodiments, the protective agent comprises at least one of boron nitride, aluminum silicate, magnesium silicate, calcium silicate, sodium silicate, potassium silicate, zirconium silicate, mica, wollastonite, microlite, talc, MgO, $Al_2O_3$, $TiO_2$, $ZrO_2$, $Y_2O_3$, $WO_2$, E-glass fibers, $ZrB_2$, aluminum nitride, silicon nitride, silicon carbide, boron carbide, $BaSO_4$, $CaF_2$, $AlF_3$, MgAl, and TiAl. In embodiments, the protective agent comprises at least one of boron nitride, mica, zircon, talc, wollastonite, microlite, barium sulfate, calcium fluoride, magnesium fluorosilicate, graphite, bone ash, titanium dioxide, silicon carbide, and aluminum fluoride. The exemplary protective agents may provide protection against corrosion, erosion, or both corrosion and erosion caused by contact with molten metal. In certain aspects of the present disclosure, the protective agent comprises boron nitride. Boron nitride exhibits excellent high temperature stability (e.g., oxidation resistant in air up to 900° C.) and is non-wetted by most molten metals, including liquid aluminum and liquid aluminum alloys. The boron nitride may be in powder form. In accordance with the present disclosure, the boron nitride is a hexagonal boron nitride (i.e., boron nitride having a hexagonal crystal structure). Thus, in embodiments of the present disclosure where the protective agent is boron nitride, the protective agent comprises hexagonal boron nitride having a flake-like morphology. In certain aspects of the present disclosure, the protective agent comprises at least 98 wt % hexagonal boron nitride, including 100 wt % hexagonal boron nitride. In certain aspects of the present disclosure, the protective agent comprises from 90 wt % to 98 wt % hexagonal boron nitride having a flake-like morphology and the balance impurities. The hexagonal boron nitride having a flake-like morphology has a specific surface area of 1 $m^2/g$ to 40 $m^2/g$, including from 1 $m^2/g$ to 30 $m^2/g$, from 1 $m^2/g$ to 20 $m^2/g$, and also including from 2 $m^2/g$ to 16 $m^2/g$. The hexagonal boron nitride having a flake-like morphology has an average particle size of 0.075 microns to 1,000 microns, including from 0.1 microns to 750 microns, from 1 micron to 500 microns, from 1 micron to 200 microns, from 1 micron to 100 microns, from 1 micron to 100 microns, from 1 micron to 50 micron, from 1 micron to 25 microns, and also including from 1 micron to 10 microns.

In accordance with the coating composition disclosed herein, the protective agent is dispersed in the binder system. Accordingly, the coating composition is a mixture comprising the binder system and the protective agent.

In accordance with the present disclosure, the binder system comprises from 40 wt % to 95 wt % of the coating composition, and the protective agent comprises from 5 wt % to 60 wt % of the coating composition. In accordance with the present disclosure, the binder system comprises from 45 wt % to 95 wt % of the coating composition, and the protective agent comprises from 5 wt % to 55 wt % of the coating composition. In accordance with the present disclosure, the binder system comprises from 50 wt % to 95 wt % of the coating composition, and the protective agent comprises from 5 wt % to 50 wt % of the coating composition. In accordance with the present disclosure, the binder system comprises from 75 wt % to 95 wt % of the coating composition, and the protective agent comprises from 5 wt % to 25 wt % of the coating composition. In accordance with the present disclosure, the binder system comprises from 75 wt % to 90 wt % of the coating composition, and the protective agent comprises from 10 wt % to 25 wt % of the coating composition. In accordance with the present disclosure, the binder system comprises from 75 wt % to 85 wt % of the coating composition, and the protective agent comprises from 15 wt % to 25 wt % of the coating composition. In accordance with the present disclosure, the binder system comprises from 50 wt % to 70 wt % of the coating composition, and the protective agent comprises from 30 wt % to 50 wt % of the coating composition. The binder system and the protective agent used in the coating composition include the various embodiments of the binder system and the protective agent described herein.

In accordance with the present disclosure, the binder system comprises from 5 wt % to 95 wt % of the coating composition, and the protective agent comprises from 5 wt % to 95 wt % of the coating composition. In accordance with the present disclosure, a caramelized carbohydrate component comprises from 60 wt % to 70 wt % of the binder system and is formed by caramelization of a mixture comprising 25 wt % to 75 wt % of a carbohydrate, 25 wt % to 70 wt % of water, 0.05 wt % to 25 wt % of acid, 0 wt % to 5 wt % of inorganic wetting agent, 0 wt % to 2 wt % of acid phosphate adhesive, and 0 wt % to 20 wt % of bentonite; and an inorganic colloidal binder comprises from 30 wt % to 40 wt % of the binder system and comprises a colloidal silica. In certain of the foregoing exemplary embodiments, the protective agent comprises boron nitride.

Also provided herein is a method of making the exemplary coating compositions disclosed herein. A method of making the coating composition disclosed herein includes preparing a mixture comprising water, a carbohydrate, and an adjuvant. The carbohydrate may comprise any one or more of the previously described carbohydrates. The adjuvant may comprise any one or more previously described adjuvants. In embodiments of the present disclosure, the mixture comprises water, sucrose, and at least one adjuvant, such as at least one of an acid, an inorganic wetting agent, an acid phosphate adhesive, or bentonite. In embodiments of the present disclosure, the mixture comprises: a carbohydrate, such as sucrose, at 50 wt % to 60 wt % of the mixture; water at 35 wt % to 45 wt % of the mixture; an acid, such as phosphoric acid, at 0.8 wt % to 1.25 wt % of the mixture; an inorganic wetting agent, such as aluminum ammonium sulfate, at 0 wt % to 0.8 wt % of the mixture; an acid phosphate adhesive, such as calcium phosphate monobasic, at 1 wt % to 1.5 wt % of the mixture; and bentonite at 0 wt % to 6 wt % of the mixture. The mixture may be prepared using suitable mixing equipment, such as a paint mixer or a high shear mixer.

After the mixture is prepared, the mixture is heated to a caramelization temperature, such as a temperature of at least 20° C., for an effective amount of time to caramelize the carbohydrate, such as a time period of at least 5 minutes, to form a caramelized carbohydrate component. In embodiments of the present disclosure, the mixture is heated to a caramelization temperature of 20° C. to 125° C., including 50° C. to 120° C., 60° C. to 120° C., 80° C. to 120° C., 100° C. to 110° C., and also including 100° C. to 105° C., for an effective amount of time to caramelize the carbohydrate, such as a time period of 5 minutes to 30 minutes, including 5 minutes to 20 minutes, and also including from 5 minutes to 10 minutes to form a caramelized carbohydrate component. In embodiments of the present disclosure, the caramelized carbohydrate component may be allowed to cool at room temperature (e.g., 20° C. to 25° C.).

Alternatively, a mixture comprising water and a pre-caramelized caramelized carbohydrate may be prepared to obtain the caramelized carbohydrate component. By utilizing a pre-caramelized caramelized carbohydrate, the mixture of water and the pre-caramelized caramelized carbohydrate need not be processed (e.g., heated to a caramelization temperature) to obtain the caramelized carbohydrate component. In such embodiments, the mixture comprising water and the pre-caramelized caramelized carbohydrate may further comprise at least one adjuvant such as at least one of an acid, an inorganic wetting agent, an acid phosphate adhesive, and bentonite. Any one or more of the previously described adjuvants may be used in the mixture comprising water and the pre-caramelized caramelized carbohydrate to obtain the caramelized carbohydrate component.

In another step of the method of making the coating composition, the caramelized carbohydrate component, which comprises at least one adjuvant, is mixed with an inorganic colloidal binder to form a binder system. Alternatively, the binder system may be formed by mixing together a caramelized carbohydrate, at least one adjuvant, and an inorganic colloidal binder. Any one or more of the previously described inorganic colloidal binders may used to form the binder system. In embodiments of the present disclosure, colloidal silica is mixed with the caramelized carbohydrate component, which comprises at least one adjuvant to form the binder system. In embodiments of the present disclosure, colloidal silica is mixed with the caramelized carbohydrate component and at least one adjuvant to form the binder system. In embodiments of the present disclosure, the caramelized carbohydrate component, which may comprise from 1 wt % to 25 wt % adjuvant (based on the total weight of the caramelized carbohydrate component), comprises from 5 wt % to 95 wt % of the binder system, and the inorganic colloidal binder comprises from 5 wt % to 95 wt % of the binder system. Conventional mixing equipment, such as a paint mixer or a high shear mixer, may be used to mix the caramelized carbohydrate component comprising the adjuvant with the inorganic colloidal binder to form the binder system.

After formation of the binder system, the method includes mixing the binder system with a protective agent to form the coating composition. Any one or more of the previously described protective agents may be mixed with the binder system to form the coating composition of the present disclosure. For example, boron nitride may be mixed with the binder system to form the coating composition. In embodiments of the present disclosure, the binder system comprises from 40 wt % to 95 wt % of the coating composition, and the protective agent, such as boron nitride, comprises from 5 wt % to 60 wt % of the coating composition. In embodiments of the present disclosure, the binder system comprises from 45 wt % to 95 wt % of the coating composition, and the protective agent, such as boron nitride, comprises from 5 wt % to 55 wt % of the coating composition. In embodiments of the present disclosure, the binder system comprises from 50 wt % to 95 wt % of the coating composition, and the protective agent, such as boron nitride, comprises from 5 wt % to 50 wt % of the coating composition. Conventional mixing equipment, such as a paint mixer or a high shear mixer, may be used to mix the binder system with the protective agent to form the coating composition.

Also provided herein are articles having a solid coating on a portion thereof. In embodiments of the present disclosure, an article comprises a substrate and a solid coating adhered to at least a portion of the substrate. The portion of the substrate to which the solid coating is adhered is preferably the portion of the substrate that, when in use, comes into contact with a molten metal. The solid coating is formed from any of the coating compositions disclosed herein, e.g., a coating composition that includes: a) a binder system comprising a mixture of a caramelized carbohydrate component, an inorganic colloidal binder, and an adjuvant; and b) a protective agent. For example, in embodiments of the present disclosure, the coating composition comprises: a) a binder system comprising a mixture of: i) a caramelized carbohydrate component which may be formed by caramelization of a mixture comprising a carbohydrate, such as sucrose, water, and adjuvants comprising an acid, such as phosphoric acid, an inorganic wetting agent, such as aluminum ammonium sulfate, and an acid phosphate adhesive, such as calcium phosphate monobasic, and ii) an inorganic colloidal binder comprising a colloidal silica; and b) a protective agent comprising boron nitride, such as hexagonal boron nitride having a flake-like morphology.

A variety of substrates can be provided with a solid coating adhered to at least a portion thereof. In embodiments of the present disclosure, the substrate comprises at least one of a refractory material, a metal material, a ceramic material, a refractory ceramic fiber, a non-refractory ceramic fiber, a glass material, and a calcium silicate material. Suitable refractory materials include, but are not limited to, low cement refractory castables, no cement refractory castables, dense fused silica refractory, refractory reinforced with fiberglass (RFM®, available from Pyrotek, Inc., Spokane, Wash.). Suitable metal materials include, but are not limited to, steel, stainless steel, and cast iron. Suitable glass materials include, but are not limited to, fiberglass, borosilicate glass, and aluminosilicate glass. Articles comprising such substrates include, but are not limited to, ladles, rakes, impellers, launder components (e.g., cast launder, launder dam), high temperature insulation fiber boards, high temperature insulation shapes, lances, thermocouple sheets, thermocouple protection sheets, sow molds, ingot molds, rigidized glass weave filters, a thermally formed (TF) combo bag, a direct chill (DC) casting pin, a DC casting downspout, a low pressure die casting (LPDC) riser tube, a transition plate (T-plate) used in DC casting, and a filter bowl.

Also provided herein is a method of making a solid coating adhered to at least a portion of a substrate. To make a solid coating adhered to at least a portion of the substrate, the coating composition is first applied to a desired portion of the substrate. The coating composition can be applied to the substrate using a variety of techniques. For example, the coating composition may be applied to the substrate by spraying, immersing, dipping, rolling, spinning, painting, curtain coating, flow coating, or other application or coating techniques known to those of skill in the art. Preferably, the coating composition is applied to the substrate by spraying. After application of the coating composition, the substrate with the applied coating composition is subjected to a heat treatment (or firing) that forms a solid coating adhered to the substrate. In embodiments of the present disclosure, the substrate with the applied coating composition is dried (e.g., in an oven at a temperature of about 25° C. to about 110° C.) to drive off excess solvent (e.g., water) prior to the heat treatment. During the heat treatment, the caramelized carbohydrate component of the binder system is pyrolyzed or otherwise burned off such that the solid coating adhered to the substrate includes the protective agent and the inorganic colloidal binder, which binds together particles of the protective agent and also binds particles of the protective agent to the substrate. In certain embodiments, the heat treatment comprises heating the substrate with the applied coating composition to a temperature of 300° C. to 1,000° C. for a time period of 1 minute to 180 minutes. In certain embodiments, the heat treatment comprises heating the substrate with the applied coating composition to a temperature of 450° C. to 1,000° C. for a time period of 15 minutes to 60 minutes. In certain embodiments, the heat treatment comprises heating the substrate with the applied coating composition to a temperature of 550° C. to 1,000° C. for a time period of 15 minutes to 60 minutes. In certain embodiments, the heat treatment comprises heating the substrate with the applied coating composition to a temperature of 600° C. to 1,000° C. for a time period of 15 minutes to 60 minutes.

In accordance with the present disclosure, a use of a coating composition described herein is to provide a solid coating adhered to a surface of a substrate. In accordance with the present disclosure, a use of a method of making a solid coating described herein is to provide a solid coating adhered to at least a portion of a substrate.

In accordance with the present disclosure, the solid coating adhered to the substrate has a thickness of 10 μm to 100 μm, including from 10 μm to 90 μm, from 15 μm to 80 μm, and also including from 20 μm to 60 μm.

In accordance with the present disclosure, the solid coating adhered to the substrate (e.g., a low density insulation fiber board (caster tip)) has an average surface hardness of at least 45 measured according to ASTM-D2240 on the Shore D scale, including from 45 to 80, from 45 to 75, from 45 to 65, and also including from 50 to 65. To determine the surface hardness, a coating composition as described herein may be sprayed onto a 4"×4" insulation fiber board specimen. The specimen with the coating composition applied thereto is dried at 110° C. for about one hour, and then fired at 600° C. for about one hour. The surface hardness is then measured according to ASTM-D2240 on the Shore D scale in five locations on the specimen, and the measurements are averaged.

In embodiments of the present disclosure, the solid coating adhered to the substrate (e.g., a glass weave fabric) has a Taber stiffness of at least 30, including from 30 to 75, from 30 to 65, from 30 to 60, and also including from 30 to 55. The Taber stiffness may be measured according to TAPPI T 566 "Bending Resistance (Stiffness) of Paper (Taber-Type Tester)." The measurements according to TAPPI T 566 are provided in "Taber Stiffness Units," which represent the bending moment necessary to bend a standardized coupon up to a 15° angle. To determine the Taber stiffness, a coating composition as described herein may be roll applied onto a 1.5"×2.625" glass weave fabric specimen. The specimen with the coating composition applied thereto is dried at 110° C. for about one hour, and then fired at 600° C. for about one hour. The Taber stiffness is then measured according to TAPPI T 566 with a motorized Taber Stiffness apparatus using five separate specimens, and the measurements are averaged. It is believed that a higher Taber stiffness correlates to a stronger coating.

In embodiments of the present disclosure, the solid coating adhered to the substrate has an air permeability of at least 25 seconds, including from 25 seconds to 100 seconds, from 25 seconds to 90 seconds, and also including from 25 seconds to 85 seconds. The air permeability may be measured according to TAPPI T 460 "Air Resistance of Paper (Gurley Method)." To determine the air permeability, a coating composition as described herein may be roll applied onto a 3"×4" glass weave fabric specimen. The specimen with the coating composition applied thereto is dried at 110° C. for about one hour, and then fired at 600° C. for about one hour. The TAPPI T 460 method measures the air resistance of a 6.45 cm$^2$ circular area of a specimen using a fixed pressure differential of 1.22 kPa. The time it takes to pass a fixed 318 mL of air through the specimen is recorded as the air permeability. It is believed that a higher air permeability (i.e., longer duration to pass air through the specimen) correlates to a closer packed protective agent on the substrate, which reduces the ability of corrosive material (e.g., gaseous magnesium) to penetrate and attack the underlying substrate, and thus, enhances corrosion resistance.

Thermodynamic calculations using FactSage™ thermochemical software (from CRCT-Thermfact, Inc. and GTT-Technologies) predicts the presence of a high temperature phosphate bonding system as a result of the binder system of the present disclosure which comprises a caramelized carbohydrate component, an adjuvant, and an inorganic colloidal binder, such as a colloidal silica binder. Boric acid ($HBO_2$) is the main bonding system for conventional coating compositions that include colloidal silica and boron nitride, which coatings are thermally resistant up to 450° C. On the other hand, the binder system of the present disclosure, which comprises a caramelized carbohydrate component, an adjuvant, and an inorganic colloidal binder, leads to the formation of different phosphate and borate bonding, which enables a protective agent, such as boron nitride, to remain bonded to a substrate at higher temperatures, such as a temperature of 750° C., which is a temperature close to aluminum casting applications.

EXAMPLES

The examples that follow illustrate certain exemplary embodiments of the coating composition described herein. The examples are given solely for the purpose of illustration and are not to be construed as limiting of the present disclosure, as many variations thereof are possible without departing from the spirit and scope of the present disclosure.

Example 1

An exemplary embodiment of the coating composition described herein was prepared. A one kilogram mixture was prepared by mixing together the following ingredients in a stainless steel container: a) food grade table sugar (i.e., sucrose) from Lantic, Inc. (Montreal, Quebec, Canada); b) water; c) laboratory grade phosphoric acid 75 wt % (i.e., a mixture of 75 wt % $H_3PO_4$ and 25 wt % water); d) calcium phosphate monobasic, including $Ca(H_2PO_4).H_2O$, from Spectrum Chemical Manufacturing Corp. (New Brunswick, N.J.); and e) laboratory grade aluminum ammonium sulfate, including $AlNH_4(SO_4)_2.12\ H_2O$, from ACP Chemicals, Inc. (Saint-Leonard, Quebec, Canada).

The mixture was prepared by adding 550 grams of sucrose, 415 grams of water, 11 grams of phosphoric acid (75 wt %), 14 grams of calcium phosphate monobasic, and 10 grams of aluminum ammonium sulfate into a stainless steel container, and then mixing the ingredients together with a paint mixer until a homogenous mixture was obtained.

The homogenous mixture was then heated to a temperature of 80° C. to 120° C. and held at this temperature for at least 5 minutes to form a caramelized carbohydrate component. The caramelized carbohydrate component was allowed to cool at room temperature (e.g., 20° C. to 25° C.).

Next, 515 grams of an inorganic colloidal binder was added to the 1 kilogram of caramelized carbohydrate component. The inorganic colloidal binder was NALCO 1144 colloidal silica available from Nalco Company (Naperville, Ill.). The colloidal silica and the caramelized carbohydrate component were then mixed together using the paint mixer to form a binder system. The mixing was carried out at room temperature (e.g., 20° C. to 25° C.) for a time sufficient to obtain a homogenous binder system (in this case, about 10 minutes). The binder system comprised about 66 wt % caramelized carbohydrate component and about 34 wt % colloidal silica.

Next, 40 grams of hexagonal boron nitride (hBN) (i.e., the protective agent) was added to 0.12 kilograms of the binder system. The hBN had the following characteristics: boron nitride content of greater than 99.9%; average particle size of about 7 microns; specific surface area by BET of about 3 $m^2/g$; and tap density of 0.23 $g/cm^3$. The hBN and the binder system were mixed together using a high shear mixer to form the coating composition. The mixing was carried out at room temperature (e.g., 20° C. to 25° C.) for a time sufficient to obtain a homogenous coating composition (in this case, about 2 minutes). In terms of weight percentage (based on the total weight of the coating composition), the ingredients of the coating composition comprise 24.841 wt % colloidal silica, 27.63 wt % sucrose, 0.573 wt % phosphoric acid, 0.359 wt % aluminum ammonium sulfate, 0.746 wt % calcium phosphate monobasic, 20.851 wt % water, and 25 wt % boron nitride.

Example 2

An article with a solid coating formed from the coating composition obtained in Example 1 was prepared. The article includes a substrate made of a refractory fiber board comprising aluminosilicate fibers. The surface of the substrate was cleaned with compressed air to remove loose materials and dust. Thereafter, a layer of the coating composition obtained in Example 1 was applied to the substrate with a spray gun according to techniques well known to those skilled in the art. The layer of the coating composition was dried in an oven at about 110° C. for about one hour. Thereafter, the substrate with the dried layer of the coating composition was subjected to a firing step at about 600° C. for about one hour to produce an article having a solid coating.

Figure 1:
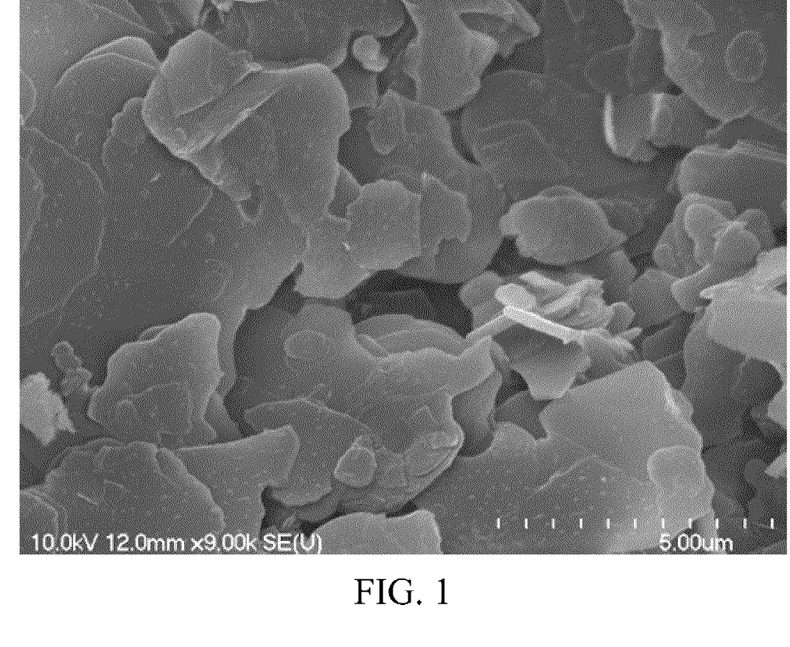
FIG. 1 is a scanning electron microscope image of a solid coating including hBN flakes according to the present disclosure.
Figure 2:
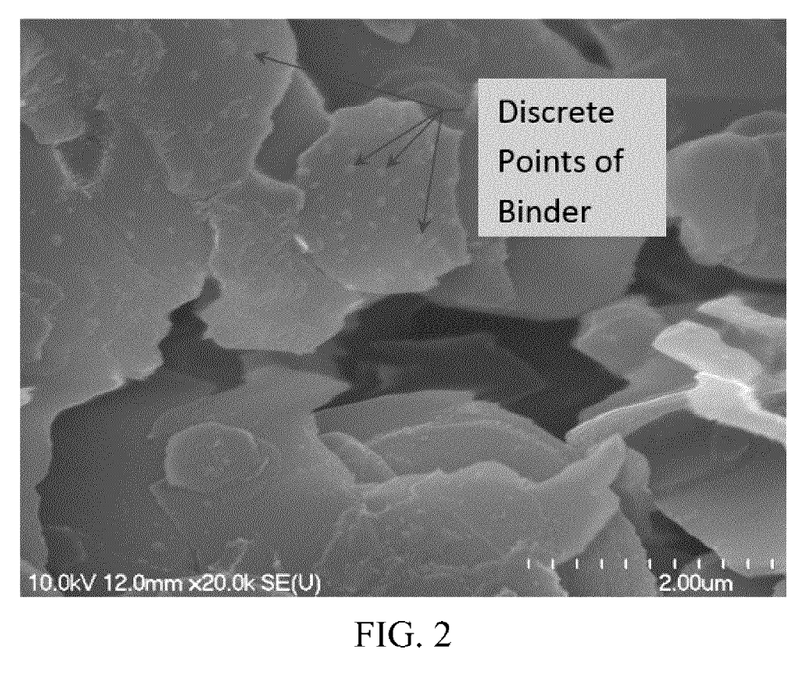
FIG. 2 is an enlarged view of the image of FIG. 1, showing discrete points of inorganic colloidal binder on the hBN flakes.

As seen in FIGS. 1 and 2, the solid coating includes a layered arrangement of hBN flakes. The hBN flakes have discrete points of the silica binder distributed on the surface of the flakes, as shown in FIG. 2. The discrete points of silica binder on the flakes produce uniform binding between the flakes themselves as well as between the flakes and the substrate to create a strongly adhered coating.

Example 3

An exemplary embodiment of the coating composition described herein was prepared. The coating composition of the present example was prepared using the same ingredients and in the same manner as described in Example 1, but a different amount of the binder system was used to prepare the coating composition. In the present example, 40 grams of hBN was added to 0.4 kilograms of the binder system. The hBN and the binder system were mixed together using a high shear mixer to form the coating composition. The mixing was carried out at room temperature (e.g., 20° C. to 25° C.) for a time sufficient to obtain a homogeneous coating composition (in this case, about 2 minutes). In terms of weight percentage (based on the total weight of the coating composition), the ingredients of the coating composition comprise 30.11 wt % colloidal silica, 33.493 wt % sucrose, 0.698 wt % phosphoric acid, 0.432 wt % aluminum ammonium sulfate, 0.904 wt % calcium phosphate monobasic, 25.273 wt % water, and 9.09 wt % boron nitride.

Example 4

An article with a solid coating formed from the coating composition obtained in Example 3 was prepared. The article includes a substrate made of a refractory material comprising aluminosilicate fibers. The surface of the substrate was cleaned with compressed air to remove loose materials and dust. Thereafter, a layer of the coating composition obtained in Example 3 was applied to the substrate with a spray gun according to techniques well known to those skilled in the art. The layer of the coating composition was dried in an oven at about 110° C. for about one hour. Thereafter, the substrate with the dried layer of the coating composition was subjected to a firing step at about 600° C. for about one hour to produce an article having a solid coating.

Figure 5:
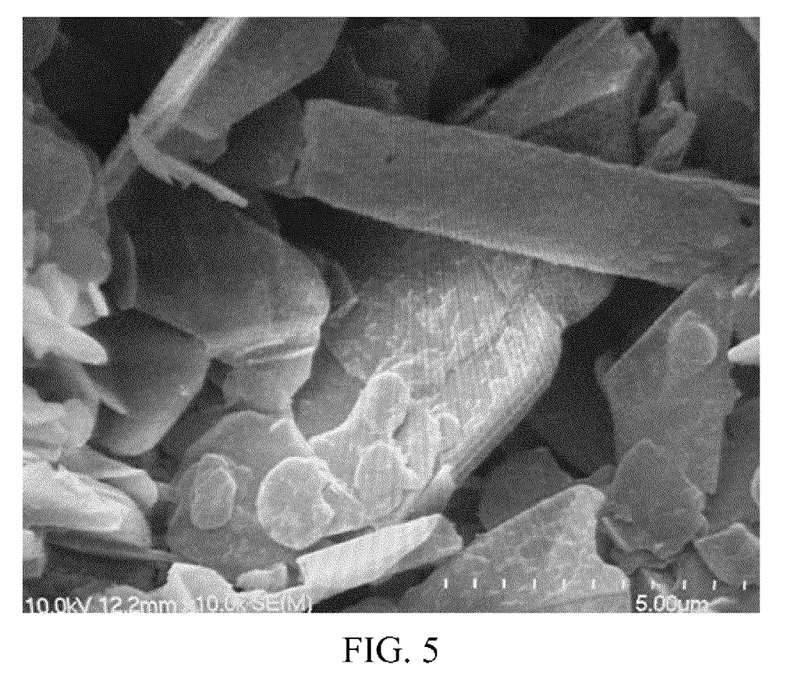
FIG. 5 is a scanning electron microscope image of a solid coating of hBN flakes according to the present disclosure.
Figure 6:
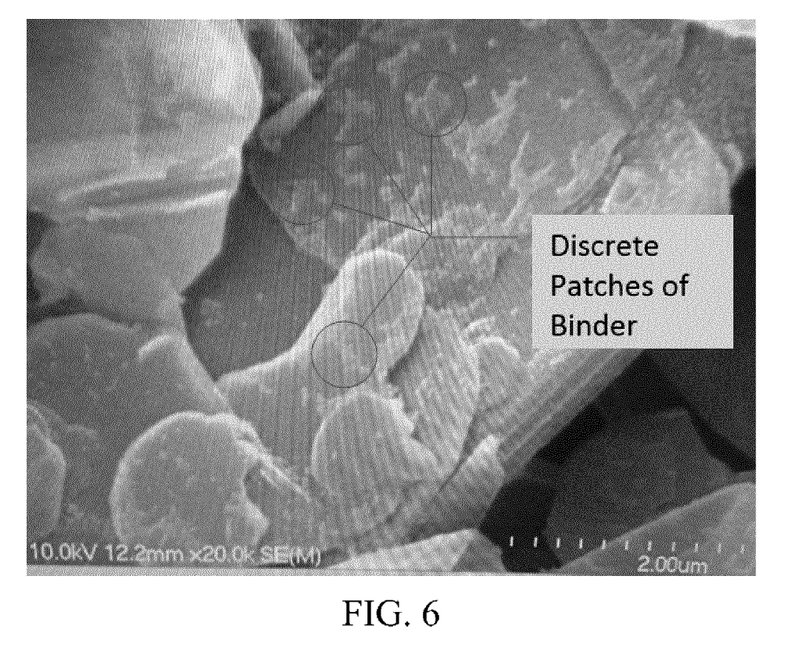
FIG. 6 is an enlarged view of the image of FIG. 5, showing discrete patches of inorganic colloidal binder of the hBN flakes.

As seen in FIGS. 5 and 6, the solid coating includes a layered arrangement of hBN flakes. The hBN flakes have discrete patches of the silica binder distributed on the surface of the flakes, as shown in FIG. 6. The discrete patches of silica binder on the flakes provide more surface area for binding between the flakes themselves as well as between the flakes and the substrate, and was achieved by increasing the amount of the binder system used in the coating composition relative to the amount of protective agent. The larger surface area created by the discrete patches of silica binder on the flakes allows for stronger adherence of the solid coating to the substrate.

Comparative Example 1

An article with a solid coating formed from a commercially available coating composition was prepared. The commercially available coating composition included boron nitride and amorphous silica as a binder. The commercially available coating composition was diluted with water at a ratio of 1.5:1 (coating to water) prior to application. The article includes a substrate made of a refractory material comprising aluminosilicate fibers. The surface of the substrate was cleaned with compressed air to remove loose materials and dust. Thereafter, a layer of the diluted commercially available coating composition was applied to the substrate with a spray gun according to techniques well known to those skilled in the art. The layer of the commercially available coating composition was dried in an oven at about 110° C. for about one hour. Thereafter, the substrate with the dried layer of the commercially available coating composition was subjected to a firing step at about 600° C. for about one hour to produce an article having a solid coating formed from the diluted commercially available coating composition.

Figure 3:
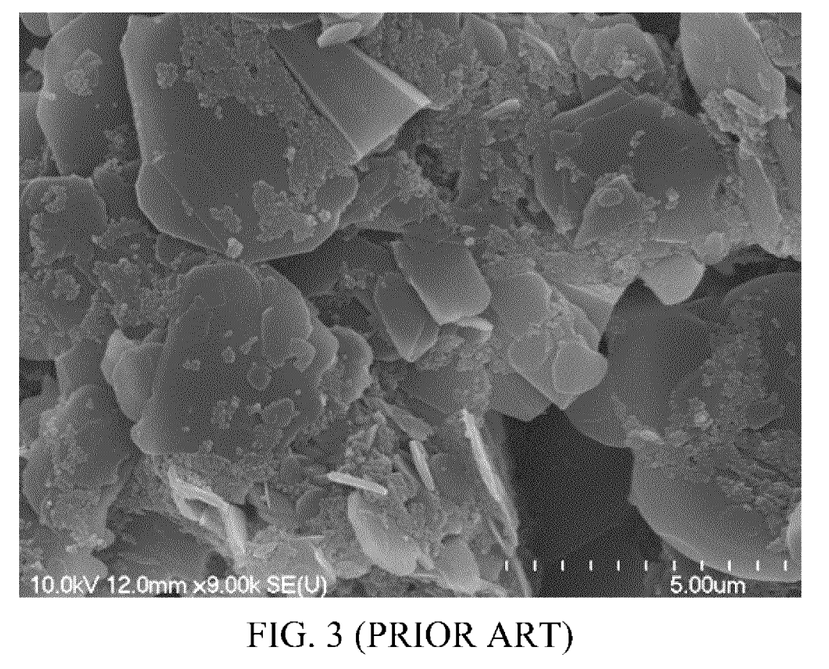
FIG. 3 is a scanning electron microscope image of a solid coating of hBN flakes according to the prior art.
Figure 4:
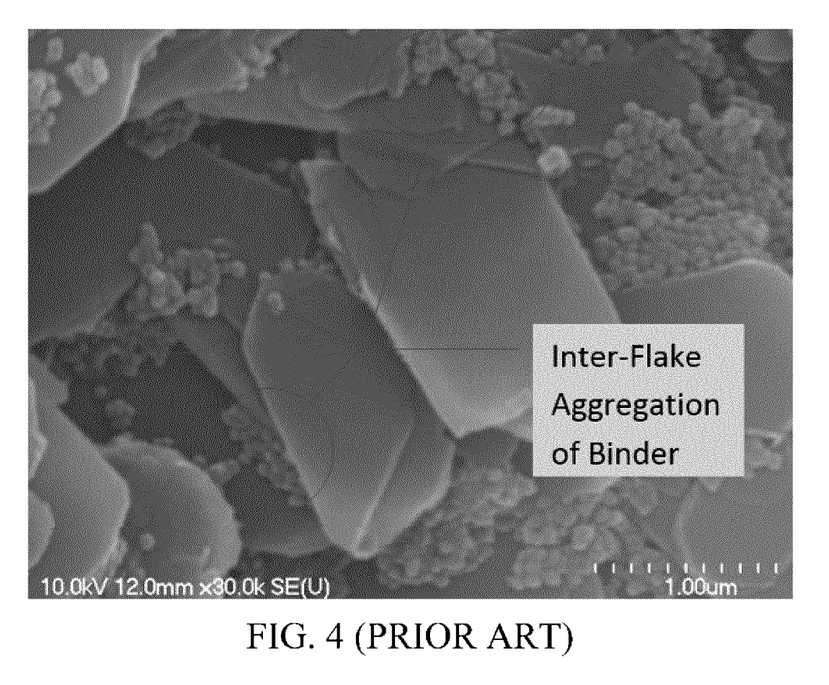
FIG. 4 is an enlarged view of the prior art image of FIG. 3, showing inter-flake aggregation of inorganic colloidal binder on the hBN flakes.

As seen in FIGS. 3 and 4, the boron nitride flakes are bound together by the blocking effect of the inter-flake aggregation of the silica binder. The differences between the binding of the commercially available coating composition and the coating composition of the present disclosure is clearly observable by comparing FIGS. 1 and 2 with FIGS. 3 and 4.

Example 5

In this example, various properties of solid coatings formed from the coating compositions disclosed herein were evaluated and compared to the properties of a solid coating formed from the commercially available coating composition of Comparative Example 1 (i.e., commercially available coating with boron nitride and amorphous silica), a commercially available coating composition (i.e., Pyrotek Coating 3321 abrasion resistant coating) from Pyrotek, Inc. (Spokane, Wash.) that comprises titanium dioxide and calcined clays, and a commercially available coating composition with boron nitride and colloidal alumina binder (i.e., commercially available coating with boron nitride and colloidal alumina).

Composition A corresponds to the coating composition described in Example 1 above. Composition B was prepared in the same way as Composition A, but included 0.2 kilograms of the binder system and 40 grams of hBN. Composition C corresponds to the coating composition described in Example 3 above. Composition D included 0.24 kilograms of the binder system (prepared as described in Example 1), 9 grams of bentonite, and 50 grams of hBN. Composition E included 0.24 kilograms of the binder system (prepared as described in Example 1), 20 grams of bentonite, and 50 grams of hBN.

Composition F, which may be prepared in a manner similar to that as described in Example 1, comprises (in terms of weight percentage based on the total weight of the composition), the following ingredients: 36.423 wt % colloidal silica, 16.823 wt % sucrose, 0.348 wt % phosphoric acid, 0.218 wt % aluminum ammonium sulfate, 0.454 wt % calcium phosphate monobasic, 12.698 wt % water, 2.662 wt % mica, 22.044 wt % wollastonite, and 8.33 wt % boron nitride.

Composition G, which may be prepared in a manner similar to that as described in Example 1, comprises (in terms of weight percentage based on the total weight of the composition), the following ingredients: 23.848 wt % colloidal silica, 26.527 wt % sucrose, 0.549 wt % phosphoric acid, 0.344 wt % aluminum ammonium sulfate, 0.716 wt % calcium phosphate monobasic, 20.016 wt % water, and 28 wt % titanium dioxide.

Composition H, which may be prepared in a manner similar to that as described in Example 1, comprises (in terms of weight percentage based on the total weight of the composition), the following ingredients: 48.78 wt % colloidal alumina, 24.39 wt % sucrose, 0.49 wt % phosphoric acid, 9.75 wt % water, and 16.59 wt % boron nitride.

Composition I, which may be prepared in a manner similar to that as described in Example 1, comprises (in terms of weight percentage based on the total weight of the composition), the following ingredients: 45.586 wt % colloidal silica, 2.965 wt % sucrose, 0.061 wt % phosphoric acid, 0.038 wt % aluminum ammonium sulfate, 0.079 wt % calcium phosphate monobasic, 2.238 wt % water, 5.36 wt % mica, and 43.67 wt % wollastonite.

Composition J, which may be prepared in a manner similar to that as described in Example 1, comprises (in terms of weight percentage based on the total weight of the composition), the following ingredients: 44.393 wt % colloidal silica, 2.887 wt % sucrose, 0.896 wt % phosphoric acid, 0.037 wt % aluminum ammonium sulfate, 0.078 wt % calcium phosphate monobasic, 0.42 wt % boric acid, 2.179 wt % water, 5.22 wt % mica, 41.8 wt % wollastonite, and 2.09 wt % chop glass fibers.

The various properties of solid coatings formed from the coating compositions are listed in Table 1.

TABLE 1

Properties of Solid Coatings

| Property | Comments | Coating Composition | Value |
|---|---|---|---|
| Corrosion | Visual Appreciation (Scale of 1 to 5) | Composition A | 1 |
| | | Composition B | 2 |
| | | Composition C | 3 |
| | | Commercially Available Coating with Boron Nitride and Amorphous Silica | 1 |
| | | Commercially Available Coating with Boron Nitride and Colloidal Alumina | 3 |
| | | Composition F | 1 |
| | | Composition H | 2 |
| Adherence | Visual Appreciation (Scale of 1 to 5) | Composition A | 1 |
| | | Composition B | 2 |
| | | Composition C | 4 |
| | | Commercially Available Coating with Boron Nitride and Amorphous Silica | 1 |
| | | Commercially Available Coating with Boron Nitride and Colloidal Alumina | 2 |
| | | Composition F | 2 |
| | | Composition H | 2 |
| Silicon Uptake by melt % | | Composition A | 0.02 |
| | | Composition F | 0.04 |
| | | Composition H | 0.03 |
| | | Commercially Available Coating with Boron Nitride and Amorphous Silica | 0.04 |
| | | Commercially Available Coating with Boron Nitride and Colloidal Alumina | 0.17 |
| | | Composition G | 0.39 |
| | | Pyrotek Coating 3321 | 0.88 |
| Surface Hardness | Shore D | Composition B | 47.8 |
| | | Composition D | 64.8 |
| | | Commercially Available Coating with Boron Nitride and Amorphous Silica | 42.8 |
| | | Composition G | 55 |
| | | Composition I | 57 |
| | | Composition J | 54.8 |
| | | Pyrotek Coating 3321 | 51.8 |
| Abrasion | Weight Loss % (ASTM D-4060) | Composition I | 0.58 |
| | | Composition J | 0.66 |
| | | Composition G | 2.33 |
| | | Commercially Available Coating with Boron Nitride and Amorphous Silica | 3.56 |
| | | Pyrotek Coating 3321 | 3.81 |
| Rigidity | Taber Stiffness Units (TSU) | Composition I | 25.4 |
| | | Composition J | 121 |
| | | Composition G | 161 |
| | | Commercially Available Coating with Boron Nitride and Amorphous Silica | 12 |
| | | Pyrotek Coating 3321 | 3 |
| Teledyne-Taber Stiffness | Flexion Resistance of Coated Glass Weave | Composition A | 32.2 |
| | | Composition B | 45.1 |
| | | Composition E | 55.7 |
| | | Commercially Available Coating with Boron Nitride and Amorphous Silica | 20.0 |
| Air Permeability (seconds) | Time Required for a Volume of Air to Flow Through a Coated Glass Weave | Composition A | 84.3 |
| | | Composition B | 27.3 |
| | | Commercially Available Coating with Boron Nitride and Amorphous Silica | 15.8 |
| PRz (microns) | Roughness Measurement | Composition A | 85.6 |
| | | Composition B | 106.8 |
| | | Composition D | 76.3 |
| | | Commercially Available Coating with Boron Nitride and Amorphous Silica | 132.3 |

The corrosion and adherence properties of the coating formulations were determined visually using a box test method. In the box test, each coating formulation was prepared and applied on an aluminosilicate board. Each coated board was dried at 110° C. overnight. Each dried, coated board was then cut into 6 sections, 5 of which were used to produce a refractory box (4"×5"×4") with the coated sides facing inward. Each box was reinforced with a fiberglass wrapping on the outside of the box. A 1 kg solid sample of 5182 aluminum alloy (4.5% Mg) was placed in each box. Each box containing the 1 kg sample of 5182 aluminum alloy was placed in an oven preheated to 700° C. After 72 hours, the box is removed from the oven and immediately processed. The surface slag is broken and partly removed. The aluminum sample is collected while still molten. The remaining slag and aluminum are removed by inverting the box over a refractory pan. After cooldown, the box is partly disassembled for observation. The corrosion of the board and adherence of metal on the surfaces of the board are evaluated visually. For corrosion, a score of 1 indicates no corrosion, a score of 2 indicates slight corrosion in discrete patches, a score of 3 indicates slight corrosion on most surfaces, a score of 4 indicates medium corrosion on all surfaces, and a score of 5 indicates severe corrosion deep in the substrate. For adherence, a score of 1 indicates no adherence (skull easily removed), a score of 2 indicates slight adherence leaving marks on the substrate (no spalling of substrate), a score of 3 indicates slight adherence leaving marks on the substrate with spalling of the substrate, a score of 4 indicates medium adherence with large spalling of the substrate, and a score of 5 indicates strong adherence (skull not removable).

As seen in Table 1, Composition A received a score of 1 for both corrosion and adherence, and Composition F received scores of 1 for corrosion and 2 for adherence. These results are in line with the corrosion performance achieved by the commercially available coating composition with boron nitride and amorphous silica. Notably, however, Composition F achieved the same corrosion scores as Composition A, while utilizing less boron nitride (8.33 wt % boron nitride (based on total weight of composition) for Composition F and 25 wt % boron nitride (based on total weight of composition) for Composition A). It is believed that the coating compositions of the present disclosure can achieve similar corrosion performance as the commercially available coating composition with boron nitride and amorphous silica, while utilizing much less boron nitride.

As also seen in Table 1, Composition H, which includes boron nitride and a colloidal alumina binder, received a score of 2 for both corrosion and adherence. In addition, the silicon uptake by melt % for Composition H was 0.03%. The silicon uptake by melt % is an indicator of material degradation in the box test. A lower silicon uptake by melt % value indicates less occurrence of corrosion. The commercially available coating composition with boron nitride and colloidal alumina received a score of 3 for corrosion and a score of 2 for adherence. Furthermore, the commercially available coating composition with boron nitride and colloidal alumina had a silicon uptake by melt % value of 0.17%. Accordingly, the Composition H exhibited better corrosion protection and a similar adherence value as compared to the commercially available coating composition with boron nitride and colloidal alumina.

As seen in Table 1, Compositions G, I, and J exhibited a weight loss (%) when tested in accordance with ASTM D-4060 (Taber abraser; abrasive wheel type=H-18; mass on wheels=500 grams; 100 cycles) of 2.33%, 0.58%, and 0.66%, respectively. The commercially available coating composition with boron nitride and amorphous silica and the Pyrotek Coating 3321 were also tested in accordance with ASTM D-4060 (Taber abraser; abrasive wheel type=H-18; mass on wheels=500 grams; 100 cycles) and exhibited a weight loss of 3.56% and 3.83%, respectively. Accordingly, the exemplary coating compositions of the present disclosure exhibited less weight loss and, thus, better protection against erosion as compared to the commercially available coating composition with boron nitride and amorphous silica and the Pyrotek Coating 3321.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the present disclosure, in its broader aspects, is not limited to the specific details, the representative compositions and processes, and illustrative examples shown and described. Accordingly, departures may be made from such details without departing from the spirit or scope of the present disclosure.

What is claimed is:

1. A coating composition comprising:
   a) a binder system comprising a mixture of:
      i) a caramelized carbohydrate component,
      ii) an adjuvant, and
      iii) an inorganic colloidal binder; and
   b) a protective agent selected from the group consisting of a silicate, a boride, a nitride, a carbide, a sulfide, a fluoride, an aluminide, synthetic glass, glass fibers, ceramic fibers, graphite, bone ash, aluminum titanate, calcium aluminate, and combinations thereof;
   wherein the coating composition, when solidified on a substrate has a thickness of from about 10 µm to about 100 µm.

2. The coating composition of claim 1, wherein the caramelized carbohydrate component is derived from at least one of a monosaccharide, a disaccharide, a trisaccharide, or an oligosaccharide.

3. The coating composition of claim 1, wherein the caramelized carbohydrate component is derived from at least one of sucrose, glucose, fructose, galactose, maltose, or lactose.

4. The coating composition of claim 1, wherein the inorganic colloidal binder comprises at least one of a colloidal silica, a colloidal alumina, a colloidal zirconia, a colloidal yttria, an organically modified colloidal silica, an organically modified colloidal alumina, an organically modified colloidal zirconia, or an organically modified colloidal yttria.

5. The coating composition of claim 1, wherein the protective agent is dispersed in the binder system.

6. The coating composition of claim 1, wherein the adjuvant comprises at least one of an acid, an inorganic wetting agent, an acid phosphate adhesive, or bentonite.

7. The coating composition of claim 6, wherein when the adjuvant comprises an acid, the acid comprises at least one of phosphoric acid, sulfuric acid, citric acid, acetic acid, boric acid, or oxalic acid;
   wherein when the adjuvant comprises an inorganic wetting agent, the inorganic wetting agent comprises at least one of aluminum ammonium sulfate, magnesium sulfate, aluminum sulfate, or calcium sulfate; and
   wherein when the adjuvant comprises an acid phosphate adhesive, the acid phosphate adhesive comprises at least one of calcium phosphate, magnesium phosphate, or aluminum phosphate.

8. The coating composition of claim 1, wherein the caramelized carbohydrate component comprises from 5 wt % to 70 wt % of the binder system, the adjuvant comprises from 0.25 wt % to 10 wt % of the binder system, and the inorganic colloidal binder comprises from 25 wt % to 90 wt % of the binder system.

9. The coating composition of claim 1, wherein the binder system comprises from 40 wt % to 95 wt % of the coating composition, and the protective agent comprises from 5 wt % to 60 wt % of the coating composition.

10. The coating composition of claim 1, wherein the caramelized carbohydrate component is derived from sucrose and the inorganic colloidal binder comprises colloidal silica.

11. An article comprising:
   a) a substrate; and
   b) a solid coating adhered to at least a portion of the substrate, wherein the solid coating has a thickness of 10 µm to 100 µm and is formed from a coating composition comprising:
      i) a binder system comprising a mixture of:
         A) a caramelized carbohydrate component,
         B) an adjuvant, and
         C) an inorganic colloidal binder; and
      ii) a protective agent selected from the group consisting of a silicate, a boride, a nitride, a carbide, a sulfide, a fluoride, an aluminide, synthetic glass, glass fibers, ceramic fibers, graphite, bone ash, aluminum titanate, calcium aluminate, and combinations thereof.

12. The article of claim 11, wherein the caramelized carbohydrate component is derived from at least one of a monosaccharide, a disaccharide, a trisaccharide, or an oligosaccharide.

13. The article of claim 11, wherein the caramelized carbohydrate component is derived from at least one of sucrose, glucose, fructose, galactose, maltose, or lactose.

14. The article of claim 11, wherein the inorganic colloidal binder comprises at least one of a colloidal silica, a colloidal alumina, a colloidal zirconia, a colloidal yttria, an organically modified colloidal silica, an organically modified colloidal alumina, an organically modified colloidal zirconia, or an organically modified colloidal yttria.

15. The article of claim 11, wherein the protective agent comprises at least one of boron nitride, mica, talc, wollastonite, calcium fluoride, magnesium fluorosilicate, graphite, bone ash, silicon carbide, or aluminum fluoride.

16. The article of claim 11, wherein the caramelized carbohydrate component comprises from 5 wt % to 70 wt % of the binder system, the adjuvant comprises from 0.25 wt % to 10 wt % of the binder system, and the inorganic colloidal binder comprises from 25 wt % to 90 wt % of the binder system.

17. The article of claim 11, wherein the binder system comprises from 40 wt % to 95 wt % of the coating composition, and the protective agent comprises from 5 wt % to 60 wt % of the coating composition.

18. The article of claim 11, wherein the substrate comprises at least one of a refractory material, a metal material, a ceramic material, a refractory ceramic fiber, a non-refractory ceramic fiber, a glass material, or a calcium silicate material.

19. A coating composition comprising:
a protective agent selected from the group consisting of a silicate, a boride, a nitride, a carbide, a sulfide, a fluoride, an aluminide, synthetic glass, glass fibers, ceramic fibers, graphite, bone ash, aluminum titanate, calcium aluminate, and combinations thereof,
wherein the coating composition when solidified on a substrate inhibits one or more of corrosion and erosion caused by molten metal, has a thickness of 10 μm to 100 μm, and has a surface hardness of at least 45 measured according to ASTM-D2240 on the Shore D scale.

20. A coating composition comprising:
a protective agent selected from the group consisting of a silicate, a boride, a nitride, a carbide, a sulfide, a fluoride, an aluminide, synthetic glass, glass fibers, ceramic fibers, graphite, bone ash, aluminum titanate, calcium aluminate, and combinations thereof,
wherein the coating composition when solidified on a substrate inhibits one or more of corrosion and erosion caused by molten metal, has a thickness of 10 μm to 100 μm, and has a Taber stiffness of at least 30.

* * * * *